United States Patent
Liang et al.

(10) Patent No.: US 10,172,138 B2
(45) Date of Patent: Jan. 1, 2019

(54) METHOD, APPARATUS, AND STORAGE MEDIUM FOR WIRELESS COMMUNICATION

(71) Applicant: TENCENT TECHNOLOGY (SHENZHEN) COMPANY LIMITED, Shenzhen (CN)

(72) Inventors: Zhigang Liang, Shenzhen (CN); Wen Zhang, Shenzhen (CN); Xin Wan, Shenzhen (CN); Mingjin Wu, Shenzhen (CN); Lingling Zou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 445 days.

(21) Appl. No.: 14/733,796

(22) Filed: Jun. 8, 2015

(65) Prior Publication Data

US 2015/0271808 A1 Sep. 24, 2015

Related U.S. Application Data

(63) Continuation of application No. PCT/CN2013/084829, filed on Oct. 8, 2013.

(30) Foreign Application Priority Data

Dec. 6, 2012 (CN) .......................... 2012 1 0519192

(51) Int. Cl.
*H04W 72/04* (2009.01)
*H04W 4/80* (2018.01)
(Continued)

(52) U.S. Cl.
CPC ........... *H04W 72/048* (2013.01); *H04L 69/14* (2013.01); *H04W 4/023* (2013.01); *H04W 4/80* (2018.02);
(Continued)

(58) Field of Classification Search
CPC combination set(s) only.
See application file for complete search history.

(56) References Cited

U.S. PATENT DOCUMENTS

| 2007/0099668 A1* | 5/2007 | Sadri | H04W 16/28 |
| | | | 455/562.1 |
| 2009/0034498 A1* | 2/2009 | Banerjea | H04W 92/18 |
| | | | 370/338 |

(Continued)

FOREIGN PATENT DOCUMENTS

| CN | 1799233 A | 7/2006 |
| CN | 101779419 A | 7/2010 |

(Continued)

OTHER PUBLICATIONS

The State Intellectual Property Office of the People's Republic of China (SIPO) Office Action 1 for 201210519192.8 dated Apr. 5, 2016 pp. 1-7.

(Continued)

*Primary Examiner* — Kevin C. Harper
*Assistant Examiner* — Mon Cheri S Davenport
(74) *Attorney, Agent, or Firm* — Anova Law Group, PLLC

(57) ABSTRACT

The present disclosure is related to the communication field, and provides method, apparatus, and storage medium for wireless communication. The method includes: establishing a WIFI channel and a Bluetooth channel between communication devices; detecting a communication distance between the communication devices; and transmitting multimedia data between communication devices through the WIFI channel and transmitting a control command between communication devices through the Bluetooth channel when the communication distance between the communication devices is less than or equal to a distance threshold. With the method provided in the present disclosure, a seamless switch (Continued)

between Bluetooth and WIFI can be implemented, respective advantages of Bluetooth and WIFI can be combined, thereby ensuring an unobstructed communication link in a small range wireless communication system, and improving the communication quality.

14 Claims, 4 Drawing Sheets

(51) Int. Cl.
*H04W 4/02* (2018.01)
*H04L 29/06* (2006.01)
*H04W 76/15* (2018.01)
*H04W 84/12* (2009.01)
*H04W 84/18* (2009.01)

(52) U.S. Cl.
CPC ............ *H04W 76/15* (2018.02); *H04W 84/12* (2013.01); *H04W 84/18* (2013.01)

(56) References Cited

U.S. PATENT DOCUMENTS

| | | | |
|---|---|---|---|
| 2010/0144340 A1* | 6/2010 | Sudak | H04B 1/406 455/426.1 |
| 2010/0162328 A1* | 6/2010 | Karaoguz | H04N 7/106 725/80 |

FOREIGN PATENT DOCUMENTS

| | | |
|---|---|---|
| CN | 101911820 A | 12/2010 |
| CN | 101984725 A | 3/2011 |
| CN | 102684775 A | 9/2012 |

OTHER PUBLICATIONS

The World Intellectual Property Organization (WIPO) International Search Report for PCT/CN2013/084829 dated Jan. 16, 2014.

* cited by examiner

METHOD, APPARATUS, AND STORAGE MEDIUM FOR WIRELESS COMMUNICATION

CROSS-REFERENCES TO RELATED APPLICATIONS

This application is a continuation of PCT Application No. PCT/CN2013/084829, filed on Oct. 8, 2013, which claims priority to Chinese Patent Application No. CN 201210519192.8, filed on Dec. 6, 2012, the entire contents of all of which are incorporated herein by reference.

FIELD OF THE TECHNOLOGY

The present disclosure generally relates to the field of communication and, more particularly, relates to method, apparatus, and storage medium for wireless communication.

BACKGROUND OF THE DISCLOSURE

Existing wireless communication manners typically include Bluetooth communication and WIFI communication. Bluetooth is often used for communications among multiple communication devices. Bluetooth supports voice and data communication, and enables one or more communication devices to perform wireless communication within 10 meters. WIFI is a wireless communication technology that is established based on an IEEE802.11 standard and used for implementing interconnection and intercommunication between wireless communication devices.

In an existing small-range wireless communication system such as a digital home network system, wireless transmission among communication devices may generally be implemented only by Bluetooth transmission or only by WIFI transmission.

SUMMARY

Bluetooth and WIFI both have their limitations, for example, Bluetooth has a short transmission distance and a low transmission speed and is limited by obstacles, while WIFI is poor in transmission stability; therefore, a communication link in an existing wireless communication system is limited by wireless communication manners, it is hard to provide an unobstructed communication link, and communication quality is poor.

In view of this, the present disclosure provides a wireless communication method, apparatus, and storage medium so that the communication link in the wireless communication system is unobstructed and the communication quality is improved.

According to one aspect of the present disclosure, a wireless communication method is provided, including the following steps: establishing a WIFI channel and a Bluetooth channel between communication devices; detecting a communication distance between the communication devices; and transmitting multimedia data between communication devices through the WIFI channel and transmitting a control command between communication devices through the Bluetooth channel when the communication distance between the communication devices is less than or equal to a distance threshold.

According to another aspect of the present disclosure, a wireless communication apparatus is provided, including: a channel establishing unit, configured to establish a WIFI channel and a Bluetooth channel between communication devices; a communication distance detection unit, configured to detect a communication distance between the communication devices; and a first data transmission unit, configured to transmit multimedia data between communication devices through the WIFI channel and transmit a control command between communication devices through the Bluetooth channel, when the communication distance between the communication devices is less than or equal to a distance threshold.

According to another aspect of the present disclosure, there is provided a non-transitory computer readable storage medium including a computer readable program stored thereon. When being executed, the computer readable program causes a computer to implement a wireless communication method is provided, including the following steps: establishing a WIFI channel and a Bluetooth channel between communication devices; detecting a communication distance between the communication devices; and transmitting multimedia data between communication devices through the WIFI channel and transmitting a control command between communication devices through the Bluetooth channel when the communication distance between the communication devices is less than or equal to a distance threshold.

In the foregoing aspects of the present disclosure, when a communication distance between communication devices is greater than a distance threshold, the communication devices use WIFI to perform communication; and when the communication distance between the communication devices is less than or equal to a distance threshold, the communication devices use WIFI to transmit multimedia data and use Bluetooth to transmit a control command; in this way, a seamless switch between Bluetooth and WIFI is implemented and respective advantages of Bluetooth and WIFI are combined, thereby ensuring an unobstructed communication link in a small range wireless communication system, and improving the communication quality.

BRIEF DESCRIPTION OF THE DRAWINGS

To describe various aspects of the present disclosure more clearly, the accompanying drawings required for illustrating the embodiments or the existing technology are introduced briefly in the following. Apparently, the accompanying drawings in the following description are only some embodiments of the present invention, and a person of ordinary skill in the art may obtain other drawings based on these accompanying drawings without creative efforts.

DESCRIPTION OF EMBODIMENTS

The following further describes embodiments of the present invention in detail with reference to the accompanying drawings. It should be understood that the specific embodiments described herein are only used to explain the present disclosure, not used to limit the present disclosure.

In the embodiments of the present invention, when a communication distance between communication devices is greater than a distance threshold, the communication devices use WIFI to perform communication; and/or when the communication distance between the communication devices is less than or equal to a distance threshold, the communication devices use WIFI to transmit multimedia data and use Bluetooth to transmit a control command; in this way, a seamless switch between Bluetooth and WIFI is implemented and respective advantages of Bluetooth and WIFI are combined, thereby ensuring an unobstructed communication link in a small range wireless communication system, and improving the communication quality.

The method provided in the embodiments of the present invention may be applicable to a small range wireless communication system such as a digital home network system. To describe the wireless communication method of the embodiments of the present invention clearly, briefly, and completely, the following makes description by using the digital home network system as an example. For another small range wireless communication system, a principle thereof is consistent with that of the digital home network system. By using an example in which the digital home network system includes a remote control and a set-up box, it may be understood that the digital home network system has a same communication principle when including other devices.

In order to describe various aspects of the present disclosure, the following makes description by using specific embodiments.

Figure 1:
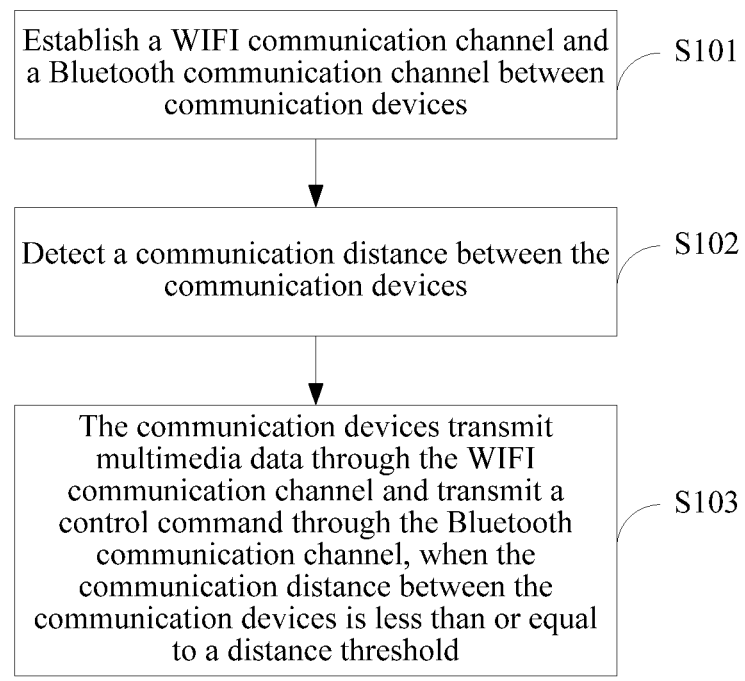
FIG. 1 illustrates an implementation flowchart of a wireless communication method according to an embodiment of the present invention.

FIG. 1 shows an implementation process of a wireless communication method according to an embodiment of the present invention. The wireless communication method starts from step S101.

Step S101: establishing a WIFI channel and a Bluetooth channel between communication devices.

In this embodiment, each communication device may be any communication device in a small range wireless communication system, such as a remote control or a set-up box in a digital home network system.

A specific procedure of establishing the WIFI channel and the Bluetooth channel between the communication devices belongs to the existing technology, which is not described herein again.

Step S102: detecting a communication distance between the communication devices.

In this embodiment, a communication distance between the communication devices that need to perform communication is detected. For example, a communication distance between the remote control and the set-up box in the digital home network system is detected. Any method provided in the existing technology may be used as a specific method for detecting the communication distance between the communication devices. The following method provided in this embodiment of the present invention may also be used: estimating the communication distance between the communication devices according to a strength value of a Bluetooth signal between the communication devices, where a specific procedure thereof belongs to the existing technology, and the details are not described herein again.

Step S103: the communication devices transmit multimedia data through the WIFI channel and transmit a control command through the Bluetooth channel, when the communication distance between the communication devices is less than or equal to a distance threshold.

In this embodiment, when the communication distance between the communication devices is less than or equal to the distance threshold, because the control command is mainly used for controlling the communication devices to give a corresponding response immediately, real-time quality and correctness of transmission of the control command need to be ensured; and the Bluetooth channel has features of a small volume of transmitted data, a stable channel, and high real-time quality. Therefore, when the communication distance between the communication devices is less than or equal to a distance threshold, the communication devices transmit the control command through the Bluetooth channel, which can meet transmission requirements of the control command on the real-time quality and the correctness. Moreover, a data volume transmitted by the control command is generally small, and in this way, the Bluetooth channel can also correctly transmit the control command with a small data volume.

In this embodiment, the multimedia data has a low requirement on the real-time quality of a channel, a data volume transmitted by the multimedia data is generally large, and the WIFI channel just has features of a large volume of transmitted data and low real-time quality. Therefore, using the WIFI channel to transmit the multimedia data can meet transmission requirements of the multimedia data.

In this embodiment, when a communication distance between communication devices is less than or equal to a distance threshold, if data to be transmitted currently is a control command, a Bluetooth channel is used to transmit the control command; and when data to be transmitted is changed from the control command to multimedia data, a switch is performed from the Bluetooth channel to a WIFI channel. In this way, a seamless switch between the Bluetooth channel and the WIFI channel is implemented, thereby ensuring an unobstructed communication link between the communication devices in a small range communication system. A specific procedure of switching from the Bluetooth channel to the WIFI channel belongs to the existing technology, which is not described herein again.

In another embodiment of the present invention, the transmitting of multimedia data between the communication devices through the WIFI channel when the communication distance between the communication devices is less than or equal to a distance threshold specifically includes:

A1: detecting a strength of a WIFI signal when the communication distance between the communication devices is less than or equal to the distance threshold;

B1: directly using, when it is determined according to the strength of the WIFI signal that the WIFI channel is available, the WIFI channel to transmit the multimedia data, and C1: switching, when it is determined according to the strength of the WIFI signal that the WIFI channel is unavailable, to the Bluetooth channel and transmitting the multimedia data through the Bluetooth channel, where a specific procedure of transmitting the multimedia data through the Bluetooth channel is as follows: adding additional multimedia data that needs to be transmitted to a tail of a Bluetooth transmission queue, and transmitting the data according to the Bluetooth transmission queue.

In this embodiment, the multimedia data has a low requirement on the real-time quality, while the control command has a high requirement on the real-time quality. Therefore, when a switch is performed from the WIFI channel to the Bluetooth channel to transmit the multimedia data, the multimedia data is added to the tail of the Bluetooth transmission queue, thereby ensuring that the control command is transmitted first in the Bluetooth transmission queue, so that the requirement of the control command on the real-time quality is met, and in addition the multimedia data can be transmitted.

In another embodiment of the present invention, the transmitting, by the communication devices, a control command through the Bluetooth channel when the communication distance between the communication devices is less than or equal to a distance threshold specifically includes:

A2: detecting strength of a Bluetooth signal when the communication distance between the communication devices is less than or equal to the distance threshold, where a specific procedure of detecting the strength of the Bluetooth signal belongs to the existing technology, and the details are not described herein again;

B2: directly using, when it is determined according to the strength of the Bluetooth signal that the Bluetooth channel is available, the Bluetooth channel to transmit the control command, where a specific procedure of determining whether the Bluetooth channel is available according to the strength of the Bluetooth signal is as follows:

determining whether the strength of the Bluetooth signal is within a range of a Bluetooth strength threshold; if yes, determining that the Bluetooth channel is unavailable; and if not, determining that the Bluetooth channel is available, where the range of a Bluetooth strength threshold refers to a strength range of the Bluetooth signal when the Bluetooth channel is unavailable, for example, when strength of the Bluetooth signal is divided into 10 levels, the range of the Bluetooth strength threshold generally is from 0.5 to 1; and C2: switching, when it is determined according to the strength of the Bluetooth signal that the Bluetooth channel is unavailable, to the WIFI channel and transmitting the control command through the WIFI channel, where a specific procedure of transmitting the control command through the WIFI channel is as follows: adding additional control command that needs to be transmitted to a head of a WIFI transmission queue, and transmitting all data of control command according to the WIFI transmission queue.

In this embodiment, the control command has a high requirement on the real-time quality, while the multimedia data has a low requirement on the real-time quality. Therefore, when a switch is performed from the Bluetooth channel to the WIFI channel to transmit the control command, the control command is added to the head of the WIFI transmission queue, thereby ensuring that the control command is transmitted first in the WIFI transmission queue, and meeting the requirement of the control command on the real-time quality.

In another embodiment of the present invention, the method further includes:

communicating, by the communication devices, with each other through the WIFI channel when the communication distance between the communication devices is greater than the distance threshold.

The distance threshold is preset or defined by a user according to requirements. The distance threshold may be a Bluetooth communication distance, where the Bluetooth communication distance refers to a working distance when Bluetooth is used to perform communication, and the Bluetooth communication distance is generally 10 meters.

When the communication distance between the communication devices is greater than the distance threshold, for example, the communication distance is greater than the Bluetooth communication distance, the communication devices communicate with each other through the WIFI channel. The Bluetooth communication distance is, for example, about 10 meters, and a WIFI communication distance generally can reach, for example, about 96 kilometers. Therefore, when the communication distance between the communication devices is greater than the distance threshold, for example, the communication distance is greater than the Bluetooth communication distance, the WIFI channel is used to perform communication, which can ensure an unobstructed link between the communication devices when the communication distance between the communication devices is greater than the distance threshold.

In another embodiment of the present invention, the communicating, by the communication devices, with each other through the WIFI channel when the communication distance between the communication devices is greater than the distance threshold specifically includes:

A3: detecting strength of a WIFI signal when the communication distance between the communication devices is greater than the distance threshold, where a specific procedure of detecting the strength of the WIFI signal belongs to the existing technology, and the details are not described herein again;

B3: outputting a transmission failure prompt when it is determined according to the strength of the WIFI signal that the WIFI channel is unavailable, so as to inform the user that the communication distance between the communication devices is excessively far, and neither the WIFI channel nor the Bluetooth channel can be used to perform communication, where a specific procedure of determining according to the strength of the WIFI signal whether the WIFI channel is available is as follows:

determining whether the strength of the WIFI signal is within a range of a WIFI strength threshold; if yes, determining that the WIFI channel is unavailable; and if not, determining that the WIFI channel is available, where the range of a WIFI strength threshold refers to a strength range of the WIFI signal when the WIFI channel is unavailable; for example, when strength of the WIFI signal is divided into 10 levels, the range of the WIFI strength threshold is generally from 0 to 1, that is, when the highest strength of the WIFI signal is 10, the range of the WIFI strength threshold being from 0 to 1 refers to that the strength of the WIFI signal is from 0 to 1, and it may be determined that the WIFI signal will interrupt if the distance is farther; and C3: communicating, by the communication devices, with each other through the WIFI channel when it is determined according to the strength of the WIFI signal that the WIFI channel is available, where the communicating, by the communication devices, with each other through the WIFI channel refers to that the communication devices mutually transmit the control command and the multimedia data through the WIFI channel.

Figure 2:
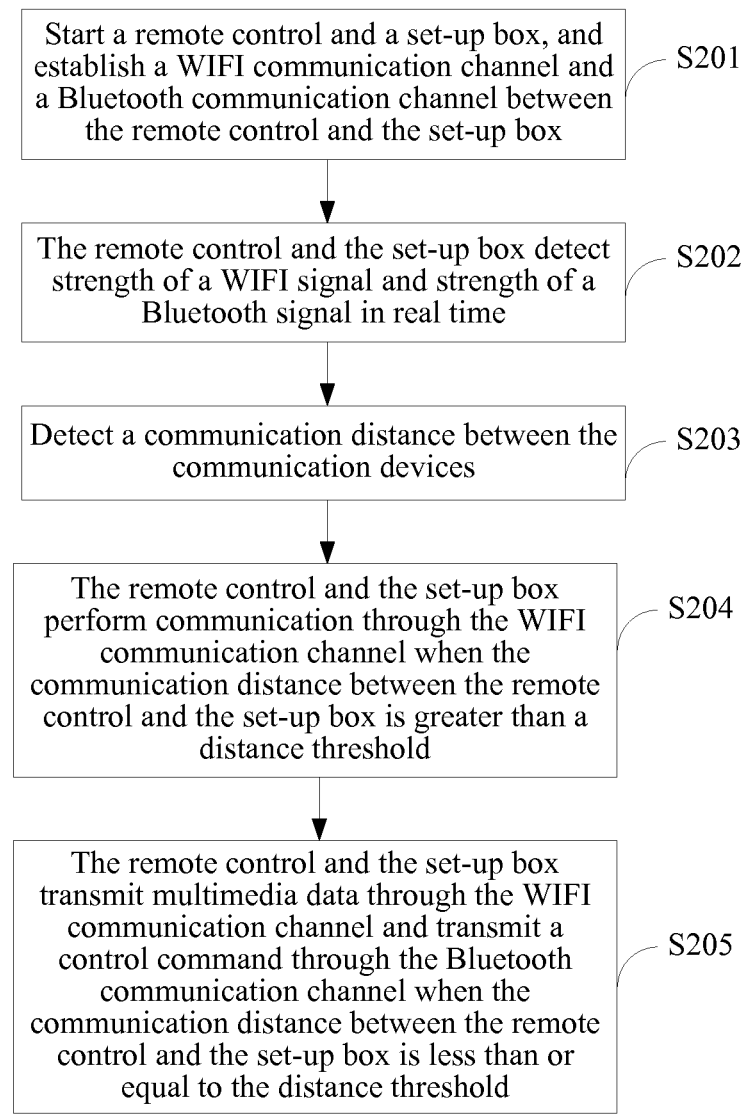
FIG. 2 illustrates an implementation flowchart of a wireless communication method according to another embodiment of the present invention.

FIG. 2 shows an implementation process of a wireless communication method according to another embodiment of the present invention. For ease of description, an example in which the communication devices are a remote control and a set-up box is also used. The wireless communication method starts from step S201.

Step S201: starting a remote control and a set-up box, and establishing a WIFI channel and a Bluetooth channel between the remote control and the set-up box, where a specific procedure is described above, and the details are not described herein again.

Step S202: the remote control and the set-up box detect a strength of a WIFI signal and strength of a Bluetooth signal in real time. Real-time detection may be detecting the strength of the WIFI signal and the strength of the Bluetooth signal at a preset duration (such as two seconds).

Step S203: detecting a communication distance between the communication devices.

Step S204: the remote control and the set-up box perform communication through the WIFI channel when the communication distance between the remote control and the set-up box is greater than a distance threshold, where a specific procedure is as follows:

when the communication distance between the remote control and the set-up box is greater than the distance threshold (such as a Bluetooth communication distance), determining according to the detected strength of the WIFI signal whether the WIFI channel is available; if yes, communicating, by the remote control and the set-up box, with each other through the WIFI channel, such as mutually transmitting a control command and multimedia data by using a WIFI communication signal; and if not, outputting a transmission failure prompt, so as to inform the user that the communication distance between the communication devices is excessively far, and neither the WIFI channel nor the Bluetooth channel can be used to perform communication.

In this embodiment, strength of the WIFI signal separately detected by the remote control and the set-up box may be different. Therefore, in this embodiment, when the communication distance between the remote control and the set-up box is greater than the distance threshold, if the remote control needs to transmit the control command or the multimedia data to the set-up box, whether the WIFI channel is unavailable is determined according to the strength of the WIFI signal detected by the remote control; and if the set-up box needs to transmit the control command or the multimedia data to the remote control, whether the WIFI channel is unavailable is determined according to the strength of the WIFI signal detected by the set-up box.

Step S205: the remote control and the set-up box transmit multimedia data through the WIFI channel and transmit a control command through the Bluetooth channel when the communication distance between the remote control and the set-up box is less than or equal to the distance threshold.

The transmitting of multimedia data between communication devices through the WIFI channel when the communication distance between the communication devices is less than or equal to a distance threshold is specifically:

when the communication distance between the communication devices is less than or equal to the distance threshold, determining according to the detected strength of the WIFI signal whether the WIFI channel is available; if yes, directly using the WIFI channel to transmit the multimedia data; and if not, switching to the Bluetooth channel and transmitting the multimedia data through the Bluetooth channel, where a specific procedure of transmitting the multimedia data through the Bluetooth channel is described above, and the details are not described herein again.

The transmitting of a control command between the communication devices through the Bluetooth channel when the communication distance between the communication devices is less than or equal to a distance threshold specifically includes:

when the communication distance between the communication devices is less than or equal to the distance threshold, determining according to the detected strength of the Bluetooth signal whether the Bluetooth channel is available; if yes, directly using the Bluetooth channel to transmit the control command; and if not, switching to the WIFI channel and transmitting the control command through the WIFI channel, where a specific procedure of transmitting the control command through the WIFI channel is described above, and the details are not described herein again.

In this embodiment, strength of a WIFI signal and strength of a Bluetooth signal of the communication devices are detected in real time, and when data needs to be transmitted, whether the WIFI channel is available may be determined directly according to the strength of the WIFI signal that is detected in real time, and whether the Bluetooth channel is available may be determined according to the strength of the Bluetooth signal, thereby performing a switch between the WIFI channel and the Bluetooth channel more rapidly and correctly, ensuring a more unobstructed communication link in a small range wireless communication system, and bringing a fluent network experience to a user.

Figure 3:
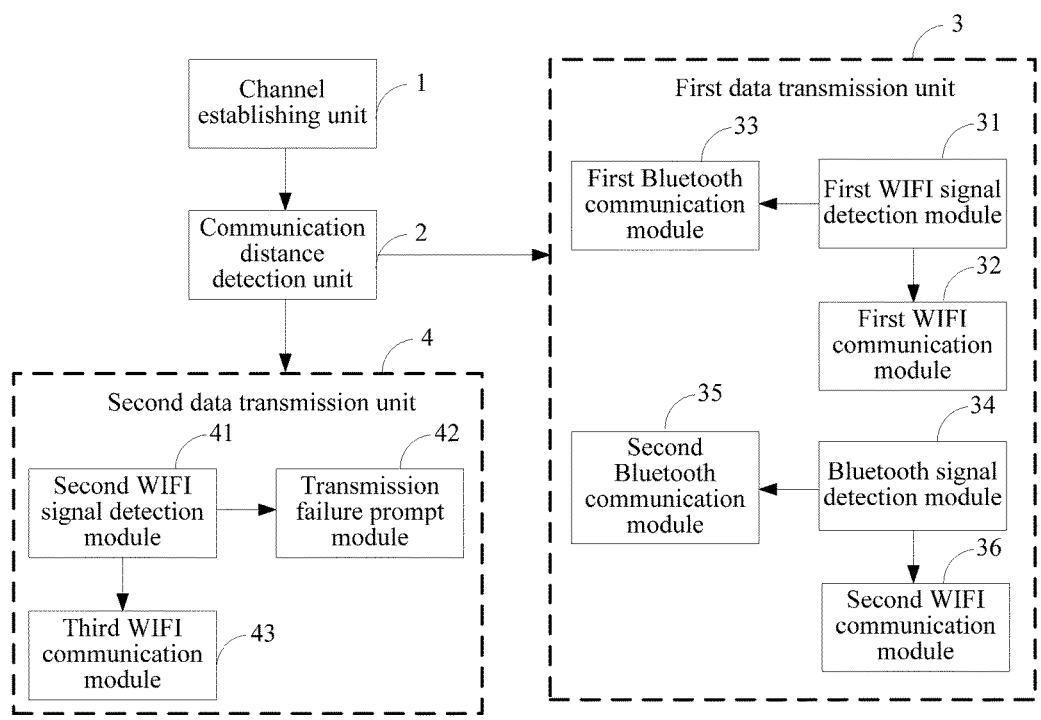
FIG. 3 illustrates a structural block diagram of a wireless communication apparatus according to an embodiment of the present invention.

FIG. 3 shows a structure of a wireless communication apparatus according to an embodiment of the present invention. For ease of description, only a part related to this embodiment of the present invention is shown.

The wireless communication apparatus may be applied to any communication device having a Bluetooth and WIFI function, for example, a remote control or a set-up box having a Bluetooth and WIFI function; the wireless communication apparatus may be a software unit, a hardware unit, or a unit combining software and hardware that runs on the devices, and may be integrated, as an independent attachment, into the communication device having a Bluetooth and WIFI function or may run in an application system of the communication device having a Bluetooth and WIFI function. Detailed description is as follows.

The wireless communication apparatus includes a channel establishing unit 1, a communication distance detection unit 2, and a first data transmission unit 3, where the term "first" in the "first data transmission unit 3" and the term "second" in a subsequently mentioned "second data transmission unit 4" are only used to differentiate components, but do not imply a sequence and also do not indicate that there must be a second data transmission unit because there is a first data transmission unit, or there must be a first data transmission unit because there is a second data transmission unit. In the exemplary apparatus, the channel establishing unit 1 establishes a WIFI channel and a Bluetooth channel between communication devices;

the communication distance detection unit 2 detects a communication distance between the communication devices; and the first data transmission unit 3 transmits multimedia data between communication devices through the WIFI channel and transmits a control command between communication devices through the Bluetooth channel, when the communication distance between the communication devices is less than or equal to a distance threshold.

In another embodiment of the present invention, the first data transmission unit 3 includes a first WIFI signal detection module 31, a first WIFI communication module 32, and a first Bluetooth communication module 33, where:

the first WIFI signal detection module 31 detects a strength of a WIFI signal when the communication distance between the communication devices is less than or equal to the distance threshold;

the first WIFI communication module 32 directly uses, when it is determined according to the strength of the WIFI signal that the WIFI channel is available, the WIFI channel to transmit the multimedia data; and the first Bluetooth communication module 33 switches, when it is determined according to the strength of the WIFI signal that the WIFI channel is unavailable, to the Bluetooth channel and transmits the multimedia data through the Bluetooth channel.

In another embodiment of the present invention, the first Bluetooth communication module 33 adds additional multimedia data that needs to be transmitted to a tail of a Bluetooth transmission queue, and transmits all multimedia data according to the Bluetooth transmission queue.

In another embodiment of the present invention, the first data transmission unit 3 further includes a Bluetooth signal detection module 34, a second Bluetooth communication module 35, and a second WIFI communication module 36, where:

the Bluetooth signal detection module 34 detects strength of a Bluetooth signal when the communication distance between the communication devices is less than or equal to the distance threshold;

the second Bluetooth communication module 35 directly uses, when it is determined according to the strength of the Bluetooth signal that the Bluetooth channel is available, the Bluetooth channel to transmit the control command; and the second WIFI communication module 36 switches, when it is determined according to the strength of the Bluetooth signal that the Bluetooth channel is unavailable, to the WIFI channel and transmits the control command through the WIFI channel.

In another embodiment of the present invention, the second WIFI communication module 36 adds a control command that needs to be transmitted to a head of a WIFI transmission queue, and transmits data according to the WIFI transmission queue.

In another embodiment of the present invention, the apparatus further includes a second data transmission unit 4. The second data transmission unit 4 enables, when the communication distance between the communication devices is greater than the distance threshold, the communication devices to communicate with each other through the WIFI channel.

The distance threshold is preset or defined by a user according to requirements. The distance threshold may be a Bluetooth communication distance, where the Bluetooth communication distance refers to a working distance when Bluetooth is used to perform communication, and the Bluetooth communication distance is generally 10 meters.

In another embodiment of the present invention, the second data transmission unit 4 includes a second WIFI signal detection module 41, a transmission failure prompt module 42, and a third WIFI communication module 43, where:

the second WIFI signal detection module 41 detects strength of a WIFI signal when the communication distance between the communication devices is greater than the distance threshold;

the transmission failure prompt module 42 outputs a transmission failure prompt when it is determined according to the strength of the WIFI signal that the WIFI channel is unavailable, so as to inform the user that the communication distance between the communication devices is excessively far, and neither the WIFI channel nor the Bluetooth channel can be used to perform communication; and the third WIFI communication module 43 enables, when it is determined according to the strength of the WIFI signal that the WIFI channel is available, the communication devices to communicate with each other through the WIFI channel.

According to an embodiment of the present invention, the wireless communication method shown in FIG. 1 may be a wireless communication method executed by units of the wireless communication apparatus shown in FIG. 3. For example, step S101 shown in FIG. 1 may be executed by the channel establishing unit 1 shown in FIG. 3. Step S102 shown in FIG. 1 may be executed by the communication distance detection unit 2 shown in FIG. 3. Step S103 shown in FIG. 1 may be executed by the first data transmission unit 3 shown in FIG. 3. It should be noted that the units included in the system are merely divided according to logical functions, but the present disclosure is not limited to the division, as long as corresponding functions can be implemented; and in addition, specific names of the units or modules are merely provided for the purpose of distinguishing the units or modules from one another, but not intended to limit the scope of the present disclosure. According to another embodiment of the present invention, units of the wireless communication apparatus shown in FIG. 3 may be partially or wholly combined into one or more other units to form the wireless communication apparatus, or a certain (or more) unit(s) can further be divided into multiple units with smaller functions to form the wireless communication apparatus. In this way, same operations can be implemented, without affecting implementation of the technical effects of the embodiment of the present invention.

A person of ordinary skill in the art may understand that all or some of the steps of the foregoing method embodiments may be implemented by a program instructing relevant hardware. The program may be stored in a computer readable storage medium. The storage medium may be a ROM/RAM, a magnetic disk, an optical disc, or the like. According to another embodiment of the present invention, a computer program (including program code) that can execute the wireless communication method shown in FIG. 1 runs on a general computing device, such as a computer, including a processing element such as a central processing unit (CPU), a random access memory (RAM), and a read-only memory (ROM) and a storage element, so as to construct the wireless communication apparatus shown in FIG. 3, and implement the wireless communication method according to the embodiments of the present invention. The computer program may be recorded on, for example, a non-transitory computer readable record medium, and stored in the computing device by using the computer readable record medium, and to perform the methods disclosed herein.

Figure 4:
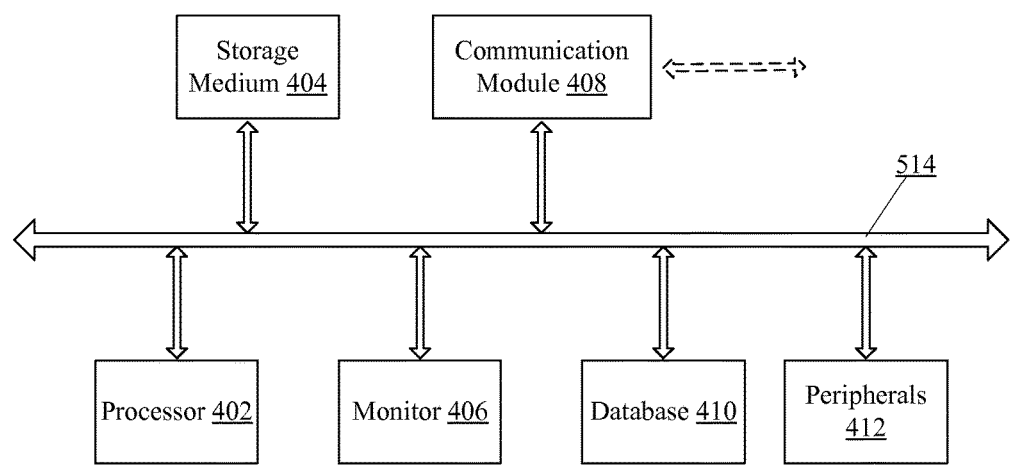
FIG. 4 illustrates an exemplary computing device consistent with the disclosed embodiments.

For example, FIG. 4 illustrates an exemplary computing device capable of implementing the disclosed methods, consistent with the disclosed embodiments. As shown in FIG. 4, the exemplary computing device 400 may include a processor 402, a storage medium 404, a monitor 406, a communication module 408, a database 410, peripherals 412, and one or more bus 414 to couple the devices together. Certain devices may be omitted and other devices may be included.

Processor 402 may include any appropriate processor or processors. Further, processor 402 may include multiple cores for multi-thread or parallel processing. The processor 402 may be used to run computer program(s) stored in the storage medium 404. Storage medium 404 may include memory modules, such as ROM, RAM, and flash memory modules, and mass storages, such as CD-ROM, U-disk, removable hard disk, etc. Storage medium 404 may store computer programs for implementing various disclosed processes, when executed by processor 402. In one embodiment, storage medium 404 may be a non-transient computer-readable storage medium having a computer program stored thereon, when being executed, to cause the computer to implement the disclosed methods.

Further, peripherals 412 may include I/O devices such as keyboard and mouse, and communication module 408 may include network devices for establishing connections, e.g., through a communication network such as the Internet. Database 410 may include one or more databases for storing certain data and for performing certain operations on the stored data, such as webpage browsing, database searching, etc.

In one embodiment, the disclosed wireless communication apparatus may include the computing device illustrated in FIG. 4. For example, the wireless communication apparatus may include one or more processors and a non-transitory computer-readable storage medium having instructions/programs stored thereon, the instructions/programs executed by the one or more processors and comprising the modules and units disclosed in the wireless communication apparatus.

In the embodiments of the present invention, when a communication distance between communication devices is greater than a distance threshold, the communication devices use WIFI to perform communication; or when the communication distance between the communication devices is less than or equal to a distance threshold, the communication devices use WIFI to transmit multimedia data and use Bluetooth to transmit a control command; in this way, a seamless switch between Bluetooth and WIFI is implemented and respective advantages of Bluetooth and WIFI are combined, thereby ensuring an unobstructed communication link in a small range wireless communication system.

Moreover, in the embodiments, the multimedia data has a low requirement on real-time quality, while the control command has a high requirement on the real-time quality. When a switch is performed from a WIFI channel to a Bluetooth channel to transmit the multimedia data, the multimedia data is added to a tail of a Bluetooth transmission queue, thereby ensuring that the control command is transmitted first in the Bluetooth transmission queue, so that the requirement of the control command on the real-time quality is met, and in addition the multimedia data can be transmitted.

Moreover, the control command has a high requirement on the real-time quality, while the multimedia data has a low requirement on the real-time quality. Therefore, when a switch is performed from the Bluetooth channel to the WIFI channel to transmit the control command, the control command is added to a head of a WIFI transmission queue, thereby ensuring that the control command is transmitted first in the WIFI transmission queue, and meeting the requirement of the control command on the real-time quality.

The foregoing describes embodiments of the present disclosure, but they are not intended to limit the scope of the present disclosure. The scope of the present disclosure is defined by the attached claims. Any modification, equivalent replacement, or improvement made within the spirit and principle of the present disclosure shall fall within the protection scope of the present disclosure.

What is claimed is:

1. A wireless communication method, comprising:
establishing a WIFI channel and a Bluetooth channel between a first communication device and a second communication device;
detecting a communication distance between the first communication device and the second communication device; and
transmitting multimedia data between the first communication device and the second communication device through the WIFI channel and transmitting a control command between the first communication device and the second communication device through the Bluetooth channel, when the communication distance between the first communication device and the second communication device is less than or equal to a distance threshold,
wherein the step of transmitting the multimedia data through the WIFI channel when the communication distance is less than or equal to the distance threshold further comprises:
detecting a strength of a WIFI signal when the communication distance between the first communication device and the second communication device is less than or equal to the distance threshold;
directly using, when it is determined according to the strength of the WIFI signal that the WIFI channel is available, the WIFI channel to transmit the multimedia data; and
switching, when it is determined according to the strength of the WIFI signal that the WIFI channel is unavailable, to the Bluetooth channel and transmitting the multimedia data through the Bluetooth channel,
wherein the step of transmitting the control command through the Bluetooth channel when the communication distance between the first communication device and the second communication device is less than or equal to a distance threshold comprises:
detecting a strength of a Bluetooth signal when the communication distance between the first communication device and the second communication device is less than or equal to the distance threshold;
directly using, when it is determined according to the strength of the Bluetooth signal that the Bluetooth channel is available, the Bluetooth channel to transmit the control command; and
switching, when it is determined according to the strength of the Bluetooth signal that the Bluetooth channel is unavailable, to the WIFI channel and transmitting the control command through the WIFI channel by:
adding additional control command that needs to be transmitted to a head of a WIFI transmission queue, and transmitting data according to the WIFI transmission queue.

2. The method according to claim 1, wherein the distance threshold is a Bluetooth communication distance.

3. The method according to claim 1, further comprising:
communicating, by the first communication device and the second communication device, with each other through the WIFI channel when the communication distance between the first communication device and the second communication device is greater than the distance threshold.

4. The method according to claim 3, wherein the step of communicating comprises:
detecting a strength of a WIFI signal when the communication distance between the first communication device and the second communication device is greater than the distance threshold;
outputting a transmission failure prompt when it is determined according to the strength of the WIFI signal that the WIFI channel is unavailable; and communicating, by the first communication device and the second communication device, with each other through the WIFI channel when it is determined according to the strength of the WIFI signal that the WIFI channel is available.

5. The method according to claim 1, wherein the step of switching to the Bluetooth channel and transmitting the multimedia data through the Bluetooth channel when it is determined according to the strength of the WIFI signal that the WIFI channel is unavailable comprises:
adding additional multimedia data that needs to be transmitted to a tail of a Bluetooth transmission queue, and transmitting the multimedia data according to the Bluetooth transmission queue.

6. A wireless communication apparatus, comprising:
a channel establishing unit, configured to establish a WIFI channel and a Bluetooth channel between a first communication device and a second communication device;
a communication distance detection unit, configured to detect a communication distance between the first communication device and the second communication device; and
a first data transmission unit, configured to transmit multimedia data between the first communication device and the second communication device through the WIFI channel and transmit a control command between the first communication device and the second communication device through the Bluetooth channel, when the communication distance between the first communication device and the second communication device is less than or equal to a distance threshold,
wherein the first data transmission unit further comprises:
a second WIFI signal detection module, configured to detect a strength of a WIFI signal when the communication distance between the first communication device and the second communication device is less than or equal to the distance threshold;
a second WIFI communication module, configured to directly use, when it is determined according to the strength of the WIFI signal that the WIFI channel is available, the WIFI channel to transmit the multimedia data; and
a first Bluetooth communication module, configured to switch, when it is determined according to the strength of the WIFI signal that the WIFI channel is unavailable, to the Bluetooth channel and transmit the multimedia data through the Bluetooth channel,
wherein the first data transmission unit comprises:
a Bluetooth signal detection module, configured to detect a strength of a Bluetooth signal when the communication distance between the first communication device and the second communication device is less than or equal to the distance threshold;
a second Bluetooth communication module, configured to directly use, when it is determined according to the strength of the Bluetooth signal that the Bluetooth channel is available, the Bluetooth channel to transmit the control command; and
a third WIFI communication module, configured to switch, when it is determined according to the strength of the Bluetooth signal that the Bluetooth channel is unavailable, to the WIFI channel and transmit the control command through the WIFI channel,
wherein the third WIFI communication module is further configured to add additional control command that needs to be transmitted to a head of a WIFI transmission queue, and transmit data according to the WIFI transmission queue.

7. The apparatus according to claim 6, further comprising:
a second data transmission unit, configured to enable the first communication device and the second communication device to communicate with each other through the WIFI channel when the communication distance between the first communication device and the second communication device is greater than the distance threshold.

8. The apparatus according to claim 7, wherein the second data transmission unit comprises:
a first WIFI signal detection module, configured to detect a strength of a WIFI signal when the communication distance between the first communication device and the second communication device is greater than the distance threshold;
a transmission failure prompt module, configured to output a transmission failure prompt when it is determined according to the strength of the WIFI signal that the WIFI channel is unavailable; and
a first WIFI communication module, configured to enable the first communication device and the second communication device to communicate with each other through the WIFI channel when it is determined according to the strength of the WIFI signal that the WIFI channel is available.

9. The apparatus according to claim 6, wherein the first Bluetooth communication module is further configured to add additional multimedia data that needs to be transmitted to a tail of a Bluetooth transmission queue, and transmit data according to the Bluetooth transmission queue.

10. A non-transitory computer readable storage medium comprising a computer readable program stored thereon, wherein, when being executed, the computer readable program causes a computer to implement a wireless communication method, the method comprising:
establishing a WIFI channel and a Bluetooth channel between a first communication device and a second communication device;
detecting a communication distance between the first communication device and the second communication device; and
transmitting multimedia data between the first communication device and the second communication device through the WIFI channel and transmitting a control command between the first communication device and the second communication device through the Bluetooth channel, when the communication distance between the first communication device and the second communication device is less than or equal to a distance threshold,
wherein the step of transmitting the multimedia data through the WIFI channel when the communication distance is less than or equal to the distance threshold further comprises:
detecting a strength of a WIFI signal when the communication distance between the first communication device and the second communication device is less than or equal to the distance threshold;
directly using, when it is determined according to the strength of the WIFI signal that the WIFI channel is available, the WIFI channel to transmit the multimedia data; and
switching, when it is determined according to the strength of the WIFI signal that the WIFI channel is unavailable, to the Bluetooth channel and transmitting the multimedia data through the Bluetooth channel, wherein the step of transmitting the control command through the Bluetooth channel when the communication distance between the first communication device and the second communication device is less than or equal to a distance threshold further comprises:

detecting a strength of a Bluetooth signal when the communication distance between the first communication device and the second communication device is less than or equal to the distance threshold;

directly using, when it is determined according to the strength of the Bluetooth signal that the Bluetooth channel is available, the Bluetooth channel to transmit the control command; and switching, when it is determined according to the strength of the Bluetooth signal that the Bluetooth channel is unavailable, to the WIFI channel and transmitting the control command through the WIFI channel by:

adding additional control command that needs to be transmitted to a head of a WIFI transmission queue, and transmitting data according to the WIFI transmission queue.

11. The non-transitory computer readable storage medium according to claim 10, wherein the step of transmitting comprises:

detecting a strength of a WIFI signal when the communication distance between the first communication device and the second communication device is greater than the distance threshold;

outputting a transmission failure prompt when it is determined according to the strength of the WIFI signal that the WIFI channel is unavailable; and communicating, by the first communication device and the second communication device, with each other through the WIFI channel when it is determined according to the strength of the WIFI signal that the WIFI channel is available.

12. The non-transitory computer readable storage medium according to claim 10, wherein the step of switching to the Bluetooth channel and transmitting the multimedia data through the Bluetooth channel when it is determined according to the strength of the WIFI signal that the WIFI channel is unavailable comprises:

adding additional multimedia data that needs to be transmitted to a tail of a Bluetooth transmission queue, and transmitting the multimedia data according to the Bluetooth transmission queue.

13. The method according to claim 1, wherein the first communication device is a remote control, and the second communication device is a set-up box.

14. The method according to claim 1, wherein the detecting a strength of a Bluetooth signal when the communication distance between the communication devices is less than or equal to the distance threshold further comprises:

determining whether a strength of the Bluetooth signal is within a range of a Bluetooth strength threshold;

when it is determined that the strength of the Bluetooth signal is within a range of a Bluetooth strength threshold, determining that the Bluetooth channel is unavailable; and when it is determined that the strength of the Bluetooth signal is not within the range of the Bluetooth strength threshold, determining that the Bluetooth channel is available, wherein the range of the Bluetooth strength threshold refers to the strength range of the Bluetooth signal when the Bluetooth channel is unavailable, and the strength of the Bluetooth signal is divided into a plurality of levels.

* * * * *